July 22, 1969 R. L. JAESCHKE 3,456,498
INERTIA SIMULATING APPARATUS
Filed Dec. 15, 1967 2 Sheets-Sheet 1

FIG.I.

Ralph L. Jaeschke,
Inventor.
Koenig, Senniger, Powers and Leavitt,
Attorneys.

3,456,498
INERTIA SIMULATING APPARATUS
Ralph L. Jaeschke, Kenosha, Wis., assignor to Eaton Yale & Towne Inc., Cleveland, Ohio, a corporation of Ohio
Filed Dec. 15, 1967, Ser. No. 691,035
Int. Cl. G01n *15/00;* G011 *3/18;* G01r *11/00*
U.S. Cl. 73—116                                    11 Claims

ABSTRACT OF THE DISCLOSURE

Apparatus is disclosed for controlling the energization of an engine testing dynamometer so as to simulate to the engine being tested a load having a preselectable inertia. The apparatus includes a small pilot flywheel which is coupled to the dynamometer input member through an eddy current coupling. The coupling is energized to a preselectable level to apply to the flywheel a torque which is a function of the energization of the coupling. The dynamometer is energized in response to the relative speeds of the dynamometer input member and the flywheel so as to apply to the engine being tested a torque load having a simulated or effective rotational inertia which is preselected by the level of energization of the eddy current coupling.

BACKGROUND OF THE INVENTION

This invention relates to apparatus for applying a test load and more particularly to such apparatus which will simulate a load having a preselectable inertia.

The testing of automotive engines is customarily performed by applying to the engine under test a preselected torque load by appropriately energizing an eddy current dynamometer. By manually varying the energization of the eddy current dynamometer, the steady state torque-speed characteristics of the engine under test can be determined. Such testing of a given engine, however, does not apply to the engine a dynamic test equivalent to the demands placed on the engine in actual automotive use. It is therefore desirable that the performance of the engine be tested under circumstances which closely resemble actual operation, that is, the engine under test should drive a load having a substantial mass or inertia. It is also desirable to test an engine under a variety of different inertial load conditions such as would be encountered when the engine is to be mounted to power different vehicles.

SUMMARY OF THE INVENTION

Among the several objects of the present invention may be noted the provision of apparatus for simulating a load having a preselectable inertia; the provision of such apparatus in which the effective inertia of the test load may be easily adjusted; the provision of such apparatus which will permit automotive engines to be tested under dynamic conditions; the provision of such apparatus which is reliable; and the provision of such apparatus which is relatively simple and inexpensive. Other objects and features will be in part apparent and in part pointed out hereinafter.

Briefly, apparatus according to this invention includes a first variable torque coupling having a rotatable input member and means for applying to the input member a reactive torque which varies as a function of the energization of the coupling. A flywheel member having a fixed, predetermined inertia is coupled to the input member of the first variable torque coupling through a second variable torque coupling which applies to the flywheel a torque which varies as a function of the energization of the second coupling. The second coupling is energized to a preselectable level. A first tachometer means provides a feedback signal which varies as a function of the speed of the input member of the first coupling and a second tachometer means provides a reference signal which varies as a function of the speed of the flywheel member. The energization of the first variable torque coupling is then controlled in response to the reference and feedback signals so that the first coupling is energized to an extent which varies as a function of the relative speeds of the input and flywheel members. Accordingly, the first torque coupling applies to its input member a reactive torque load having effective rotational inertia which is preselected by the level of energization of the second variable torque coupling.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
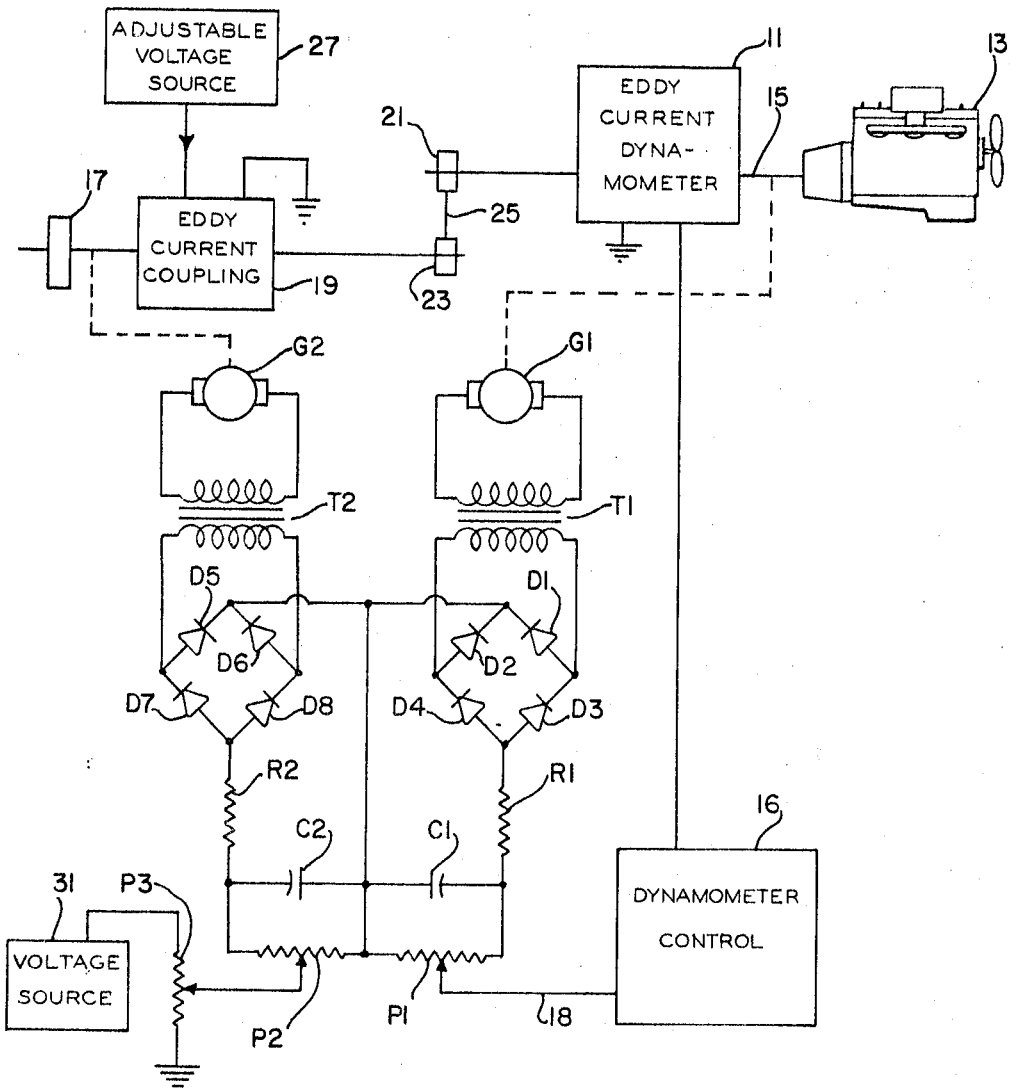
FIG. 1 is a diagrammatic illustration of an eddy current dynamometer system provided with apparatus of this invention for controlling the energization of the dynamometer to simulate a load having a preselectable inertia.

Referring now to FIG. 1, there is indicated at 11 an eddy current dynamometer of conventional construction adapted for applying a test load torque to an automotive engine such as indicated at 13. As is understood by those skilled in the art such a dynamometer essentially constitutes a variable torque, eddy current coupling. The coupling includes an input member or shaft as indicated at 15 to which the engine 13 is mechanically coupled. The shaft 15 extends through the dynamometer.

The energization of dynamometer 11 is determined by a dynamometer control circuit indicated generally at 16. Control circuit 16 is conventional and operates to vary the energization of dynamometer 11, e.g., by means of phase angle power modulation or duty cycle control, in response to the amplitude of a D.C. control signal applied thereto through a lead 18. As is understood by those skilled in the art, dynamometer 11 applies to its input member 15 a reactive torque which varies as a function of its energization.

A relatively small flywheel 17 is coupled to the dynamometer input shaft 15 through a variable torque coupling constituted by an eddy current coupling 19 and through a pair of pulleys 21 and 23 which are connected by a belt 25. When the dynamometer input shaft 15 is rotating, the eddy current coupling 19 is operative to apply to flywheel 17 a torque which varies as a function of the energization of the coupling 19. An adjustable voltage source 27 is provided for applying a preselected level of energization to the eddy current coupling 19. As is explained in greater detail hereinafter, flywheel 17 constitutes a pilot acceleration mass. Having a fixed or predetermined inertia, flywheel 17 accelerates at a rate which varies in proportion to the torque applied thereto through coupling 19.

A first A.C. tachometer generator G1 is driven by the dynamometer input shaft 15 to provide an A.C. signal having an amplitude which varies as a function of the speed of that dynamometer input member. A second A.C. tachometer generator G2 is driven by the flywheel 17 to provide an A.C. signal having an amplitude which varies as a function of the speed of the flywheel. The A.C. signals provided by generators G1 and G2 are applied to the primary windings of respective transformers T1 and T2. The turns ratios of transformers T1 and T2 are chosen to compensate for any transformation of speed by the pulleys 21 and 23.

The transformed A.C. signal provided at the secondary winding of transformer T1 is applied to the A.C. input terminals of a full-wave rectifier bridge comprising diodes D1–D4. The pulsating D.C. provided at the output terminals of the bridge is smoothed by a filter comprising a resistor R1 and a capacitor C1. As is understood by those skilled in the art, the voltage thereby provided across capacitor C1 constitutes a D.C. signal having an amplitude which varies as a function of the speed of the dynamometer input shaft 15. As is described in greater detail hereinafter, this D.C. voltage is employed as a feedback signal in controlling the energization of the dynamometer 11.

The transformed A.C. signal provided at the secondary winding of transformer T2 is applied to the A.C. input terminals of a second full-wave rectifier bridge which comprises diodes D5–D8. The pulsating D.C. provided at the output terminals of the bridge is smoothed by a filter comprising a resistor R2 and a capacitor C2. The voltage thereby provided across capacitor C2 thus constitutes a D.C. signal having an amplitude which varies as a function of the speed of flywheel 17. This D.C. voltage is employed as a reference signal in controlling the energization of dynamometer 11.

The signal voltages provided across capacitors C1 and C2 are applied across respective potentiometers P1 and P2. A voltage source 31 applies a preselected fixed voltage across a potentiometer P3. The movable tap of the reference signal potentiometer P2 is connected to the movable tap of potentiometer P3 while the movable tap of the feedback signal potentiometer P1 is connected to the dynamometer control input lead 18. The three voltage sources are thus connected in series and the voltage which is applied to lead 18 and which controls the energization of dynamometer 11 thus has an amplitude which is the algebraic sum of: a preselected voltage provided by the potentiometer P3; a variable reference voltage provided by the potentiometer P2 which reference varies as a function of the speed of the flywheel 17; and a variable feedback voltage provided by the potentiometer P1 which feedback varies as a function of the speed of the dynamometer input member 15.

As may be seen by the orientation of the diodes D1–D8, the feedback and reference voltages, provided by potentiometers P1 and P2 respectively, are algebraically summed or netted against one another in determining the voltage applied to lead 18. Thus the energization of the eddy current dynamometer 11 varies as a function of the relative speeds of the dynamometer input shaft 15 and the flywheel 17. In other words, the dynamometer input shaft 15 is subjeced to tachometer feedback control which varies the energization of dynamometer 11 to maintain the speed of input shaft 15 at a level which bears a preselected relationship to the speed of the flywheel 17. Since the flywheel 17 is accelerated by the torque transmitted by eddy current coupling 19, it can be seen that the reference signal provided by potentiometer P2 will gradually change with time and that the speed of the dynamometer input shaft 15 will therefore be permitted, by the dynamometer control circuit 16, to rise in corresponding fashion. In other words, the speed of shaft 15 will rise gradually as though it were accelerating a load having a predetermined inertia. It can thus be seen that the eddy current dynamometer 11 is controlled by the apparatus of the present invention to simulate an inertial load.

Figure 2:
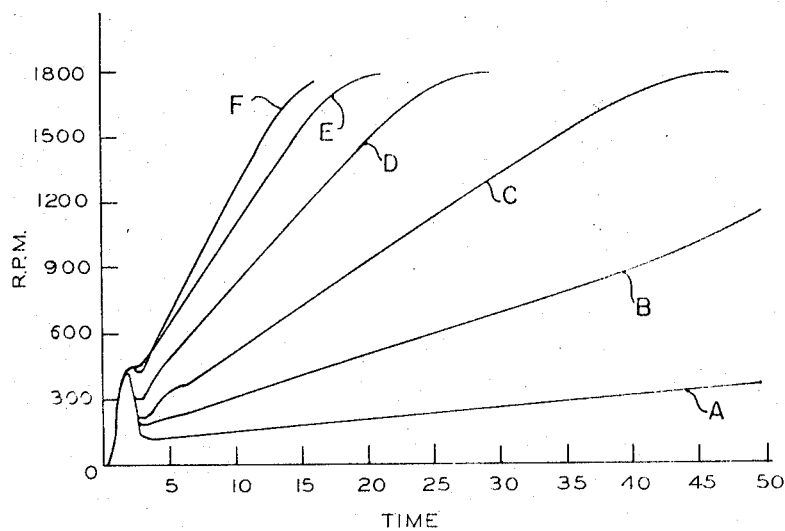
FIG. 2 is a graph showing the response of the system of FIG. 1 under different inertia settings.

The value of the simulated inertia can be varied by adjusting the voltage provided by source 27 which controls the energization of eddy current coupling 19. When the energization of coupling 19 is increased, the flywheel 17 will accelerate more rapidly and the tachometer feedback control will thus allow the dynamometer input shaft 15 to accelerate more rapidly also. Accordingly, it can be seen that an increase in the energization of coupling 19 causes a decrease in the effective value of the rotational inertia which is presented to the engine 13. Conversely, a reduction in the energization of coupling 19 will slow the acceleration of both the flywheel 19 and the dynamometer input shaft 15 so that the effective value of the simulated inertia is increased. This relationship is illustrated in FIG. 2 in which curves A–F represent the acceleration of input shaft 15 for different levels of energization of eddy current coupling 19, curve A representing the lowest level of energization of coupling 19 and curve F representing the highest level of energization. All of the curves of FIG. 2 are based upon a single level of torque being applied by engine 13.

Figure 3:
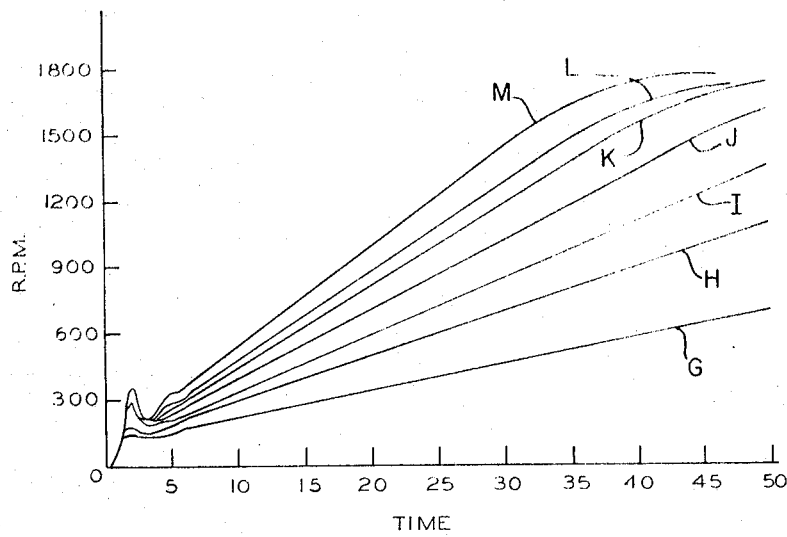
FIG. 3 is a graph representing the response of the system to different applied torques.

The curves of FIG. 3 represent the acceleration of the dynamometer input shaft 15 under different levels of applied torque, the energization of coupling 19 being the same for all of the curves. It can be seen that, for a relatively low level of applied torque, as represented by curve G, the input shaft accelerates relatively slowly while for a high level of applied torque, as represented by curve M, the input shaft accelerates relatively rapidly. In addition to the simulated inertial load provided under the control of the pilot acceleration mass constituted by the flywheel 17, an additional torque load representing a steady torque or non-inertial load may be placed on the engine by appropriately adjusting potentiometer P3 to provide an increased level of energization of the dynamometer.

While the eddy current dynamometer 11 can provide a torque only in the direction which loads or slows down the input shaft 15, it will be understood that, by providing a source of kinetic energy such as a large electric motor or a spun flywheel, a driving torque can be applied to the engine 13 through an appropriate variable torque coupling. The tachometer feedback control of this invention can then simulate an over-running inertial load as the engine 13 is throttled back. While eddy current devices have been shown to illustrate a preferred form of variable torque coupling, other types of variable torque couplings, such as magnetic fluid clutches, may also be employed.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for simulating a load having a preselectable inertia, said apparatus comprising:
   a first variable torque coupling having a rotatable input member and means for applying to said input member a reactive torque which varies as a function of the energization of said first coupling;
   a flywheel member having a fixed, predetermined inertia;
   a second variable torque coupling for coupling said input member to said flywheel member with a torque which varies as a function of the energization of said second coupling;
   means for energizing said second coupling to a preselectable level;
   first tachometer means providing a feedback signal which varies as a function of the speed of said input member;
   second tachometer means providing a reference signal which varies as a function of the speed of said flywheel member; and means responsive to said reference and feedback signals for energizing said first coupling to an extent which varies as a function of the relative speeds of said input and flywheel members whereby said first torque coupling applies to said input member a torque load having an effective rotational inertia which is preselected by the level of energization of said second coupling.

2. Apparatus as set forth in claim 1 wherein said second variable torque coupling is an eddy current coupling.

3. Apparatus as set forth in claim 2 wherein said means for energizing said second coupling includes an adjustable voltage source.

4. Apparatus as set forth in claim 1 wherein said first variable torque coupling is an eddy current dynamometer.

5. Apparatus as set forth in claim 4 wherein said reference and feedback signals are D.C. voltages and wherein said means responsive to said reference and feedback signals energizes said dynamometer to an extent which varies as a function of the algebraic sum of said D.C. voltages.

6. Apparatus as set forth in claim 1 wherein each of said tachometer means comprises an A.C. generator, diode means for rectifying the A.C. provided by the generator, and filter means for smoothing the pulsating D.C. provided by the diode means whereby said first and second tachometer means provide respective D.C. voltages which vary as functions of the speeds of the respective members.

7. Apparatus as set forth in claim 6 wherein the voltages provided by the respective tachometer means are connected in series thereby to provide a net voltage which varies as a function of the relative speeds of said input and flywheel members.

8. Apparatus as set forth in claim 7 including means for providing a preselected voltage in series with said net voltage thereby to provide a steady torque load on said input member.

9. Apparatus for applying to an engine being tested a load of a simulated preselectable inertia, said apparatus comprising:
an eddy current dynamometer having a rotatable input member adapted to be driven by said engine and means for applying to said input member a reactive torque which varies as a function of the energization of said dynamometer;
a flywheel member having a fixed, predetermined inertia;
an eddy current coupling for coupling said input member to said flywheel member with a torque which varies as a function of the energization of said coupling;
means for energizing said coupling to a preselectable level;
first tachometer means providing a feedback signal having an amplitude which varies as a function of the speed of said input member;
second tachometer means providing a reference signal having an amplitude which varies as a function of the speed of said flywheel member; and
means for energizing said dynamometer to an extent which varies as a function of the relative amplitudes of said reference and feedback signals whereby said dynamometer applies to said engine through said input member a torque load having an effective rotational inertia which is preselected by the level of energization of said eddy current coupling.

10. Apparatus as set forth in claim 9 wherein said means for energizing said second coupling comprises an adjustable voltage source whereby the value of simulated inertia can be adjusted by varying the voltage applied to said second coupling.

11. In combination with an engine testing dynamometer which is operative to apply to an engine being tested a reactive torque load which is a function of the energization of the dynamometer, apparatus for controlling the energization of said dynamometer to simulate to said engine a load having a preselectable inertia, said apparatus comprising:
a flywheel member having a fixed, predetermined inertia;
an eddy current coupling for coupling said engine to said flywheel member with a torque which varies as a function of the energization of said coupling;
means for energizing said coupling to a preselectable level;
first tachometer means providing a feedback signal having an amplitude which varies as a function of the speed of said input member;
second tachometer means providing a reference signal having an amplitude which varies as a function of the speed of said flywheel member; and
means for energizing said dynamometer to an extent which varies as a function of the relative amplitudes of said reference and feedback singals whereby said dynamometer applies to said engine a torque load having an effective rotational inertia which is preselected by the level of energization of said eddy current coupling.

References Cited
UNITED STATES PATENTS

| | | | |
|---|---|---|---|
| 2,944,419 | 7/1960 | Paalu | 73—134 |
| 2,982,128 | 5/1961 | Gibson et al. | 73—117 |
| 3,010,051 | 11/1961 | Lindemann | 324—69 X |
| 3,333,463 | 8/1967 | Hollinghurst | 73—117 |

RICHARD C. QUEISSER, Primary Examiner

J. W. MYRACLE, Assistant Examiner

U.S. Cl. X.R.

73—134; 324—69